(12) United States Patent
Saito (10) Patent No.: US 7,139,134 B2
(45) Date of Patent: Nov. 21, 2006

(54) IMAGE PICKUP LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 722 days.

(21) Appl. No.: 10/356,280

(22) Filed: Jan. 31, 2003

(65) Prior Publication Data

US 2003/0169362 A1    Sep. 11, 2003

(30) Foreign Application Priority Data

Feb. 7, 2002    (JP) ............................... 2002-30611

(51) Int. Cl.
*G02B 13/18*    (2006.01)
*G02B 9/08*    (2006.01)

(52) U.S. Cl. ...................... 359/717; 359/794
(58) Field of Classification Search ............... 359/717, 359/794, 793
See application file for complete search history.

(56) References Cited

U.S. PATENT DOCUMENTS

| | | | |
|---|---|---|---|
| 5,166,830 A | | 11/1992 | Otsu et al. |
| 5,600,493 A | * | 2/1997 | Katsuma ..................... 359/717 |
| 6,147,816 A | * | 11/2000 | Ori ............................ 359/794 |
| 6,181,477 B1 | | 1/2001 | Okajima |
| 6,335,835 B1 | * | 1/2002 | Koike ....................... 359/707 |
| 6,449,105 B1 | * | 9/2002 | Dou .......................... 359/793 |
| 6,628,463 B1 | * | 9/2003 | Koike ........................ 359/793 |

FOREIGN PATENT DOCUMENTS

| | | |
|---|---|---|
| EP | 1 170 617 | 1/2002 |
| JP | 06-230278 | 8/1994 |
| JP | 07-181379 | 7/1995 |
| JP | 07-287164 | 10/1995 |
| JP | 10-111452 | 4/1998 |
| JP | 10-206725 | 8/1998 |

* cited by examiner

*Primary Examiner*—Scott J. Sugarman
(74) *Attorney, Agent, or Firm*—Koda & Androlia (57) ABSTRACT

Provided is an image pickup lens, in which the optical characteristic can be improved and, further, the productivity can be improved through increasing the telecentricity by keeping the distance between the exit pupil and the sensor and effectively correcting the coma aberration and the distortion aberration. A first lens which is a meniscus lens having a positive power with its convex face facing an object side, a diaphragm, and a second lens which is a lens having a positive power with a strong convex face facing an image pickup surface side are provided in order from the object side. The first lens and the second lens are to satisfy the condition represented by following expressions:

$$4 \times f_2 \geq f_1 \geq f_2 \qquad (1)$$

$$1.5 \times f1 \geq f_2 \geq 0.9 \times f1 \qquad (2)$$

where,
f1: focal length of the whole lens system
$f_1$: focal length of the first lens
$f_2$: focal length of the second lens.

5 Claims, 11 Drawing Sheets

IMAGE PICKUP LENS

BACKGROUND OF THE INVENTION

1. Field of the Invention

The present invention relates to an image pickup lens and particularly, to an image pickup lens comprising two lenses which can be reduced in size and weight while achieving a wider angle of view to be used for an image pickup device utilizing an image pickup element such as a CCD, a CMOS or the like to be mounted on a portable computer, a visual telephone, a cellular phone and the like.

2. Description of the Related Art

Recently, there is a remarkable development in the multimedia industry. For example, there has been an increasing demand for a camera utilizing an image pickup element such as a CCD, a CMOS or the like to be mounted on a portable computer, a visual telephone, a cellular phone and the like. Such camera needs to be mounted on a limited space. Thus, it is desirable that the camera be small in size and light in weight.

Accordingly, an image pickup lens used for such CCD camera is also required to be small and lightweight as well. Conventionally, the so-called one-lens system using a single lens is used as such image pickup lens.

The one-lens system can work sufficiently in the case where it is used for a solid image pickup element referred to as CIF with the resolution of approximately 110,000 pixels. Recently, however, a solid image pickup element referred to as VGA with a high resolution of approximately 300,000 pixels has been investigated for use. In order to sufficiently utilize the resolving power of the solid image pickup element with such high resolution, the conventional one-lens system is not sufficient.

Thus, conventionally, a variety of two-lens systems or three-lens systems, which are superior in regards to optical characteristic compared to the one-lens system, have been proposed.

By using the three-lens system, it is possible to effectively correct each aberration causing the deterioration of the optical characteristic. Therefore, an extremely high optical characteristic can be achieved. However, the three-lens system requires a large number of components. Thus, there raises problems that it is hard to reduce the size, and the manufacturing cost is increased since each component is required to be highly precise.

On the contrary, the two-lens system can achieve higher optical characteristic compared to the one-lens system even though it is not as high as that of the three-lens system. Thus, it can be considered as a small-sized and preferable lens system for a solid image pickup element with high resolution.

As the two-lens system, conventionally, a number of lens systems so-called retrofocus type in which a lens having a negative power and a lens having a positive power are combined have been proposed. With the retrofocus type lens system, it is possible to reduce the number of elements so that the cost can be decreased. However, it is practically impossible to reduce the size as small as that of the one-lens system due to such structure with the long back focus distance.

Further, as other two-lens system, there is a lens system so-called a telephoto type in which a lens having a positive power and a lens having a negative power are combined. However, the telephoto type lens system is originally developed for silver salt photographs so that the back focus distance is too short. Further, there is an issue of telecentricity. Thus, it is practically impossible to use it as the image pickup lens for the solid image pickup element.

Also, conventionally, a two-lens system in which two lenses having positive power are combined has been proposed. Examples of such optical systems are disclosed in, for example, Japanese Patent Application Laid-open No. 7-181379, No. 7-287164, No. 10-206725, and the like.

However, it is not possible to apply the conventional image pickup lens with two lenses in which two lenses having positive power are combined as it is for the solid image pickup element. The reason is that the lens systems disclosed in any of the above-mentioned Japanese Patent Application have been developed for silver salt photographs or optical systems such as a copying machine or fax machine. Therefore, the focal length is 20 mm or more, which is notably long. Also, it is an extremely dark lens system with F No. of 4.0 or more.

SUMMARY OF THE INVENTION

The invention has been designed to overcome the foregoing problems. It is an object of the present invention is to provide an image pickup lens in which the optical characteristic and also the productivity can be improved through increasing the telecentricity by keeping the distance between the exit pupil and the image pickup surface (sensor) and enabling an effective correction of the coma aberration and the distortion aberration.

In order to achieve the foregoing object, the image pickup lens according to one aspect of the present invention comprises a first lens which is a meniscus lens having a positive power with its convex face facing an object side, a diaphragm, and a second lens which is a lens having a positive power with a strong convex face facing an image pickup surface side being provided in order from the object side. The first lens and the second lens satisfy the condition represented by following expressions:

$$4 \times f_2 \geq f_1 \geq f_2 \quad (1)$$

$$1.5 \times f1 \geq f_2 \geq 0.9 \times f1 \quad (2)$$

where, f1: focal length of the whole lens system
$f_1$: focal length of the first lens
$f_2$: focal length of the second lens.

According to one aspect of the invention, through satisfying the condition represented by the expressions (1) and (2), the distance between the exit pupil and the image pickup surface (sensor) can be maintained thereby increasing the telecentricity. Therefore, it becomes possible to effectively utilize the incoming ray to peripheral part of the sensor. Also, the coma aberration and the distortion aberration can be effectively corrected so that the optical characteristic as well as the productivity can be improved.

Also, in one aspect of the present invention, the diaphragm is placed in the vicinity of the first lens in between the first lens and the second lens.

In one aspect of the present invention, the diaphragm is placed in the vicinity of the first lens in between the first lens and the second lens. Therefore, the distance between the exit pupil and the image pickup surface (sensor) can be maintained more surely. Thereby, the telecentricity can be increased without imposing a load on the shape and the like of the second lens.

Further, in one aspect of the present invention, the second lens is a meniscus lens with its convex face facing an image pickup surface side.

In one aspect of the present invention, the second lens is a meniscus lens with its convex face facing an image pickup surface side. Therefore, the telecentricity can be effectively maintained so that the coma aberration and the distortion aberration can be effectively corrected.

In one aspect of the present invention, the first lens and the second lens are made of a resin material and at least one face of the first lens and the second lens is formed into an aspherical face.

In one aspect of the present invention, the first lens and the second lens are made of a resin material and at least one face of the first lens and the second lens is formed into an aspherical face. Therefore, it is possible to maintain the high optical characteristic while keeping the productivity.

DESCRIPTION OF THE PREFERRED EMBODIMENTS

The preferred embodiment of the present invention will be described hereinafter by referring to FIG. 1 to FIG. 11.

Figure 1:
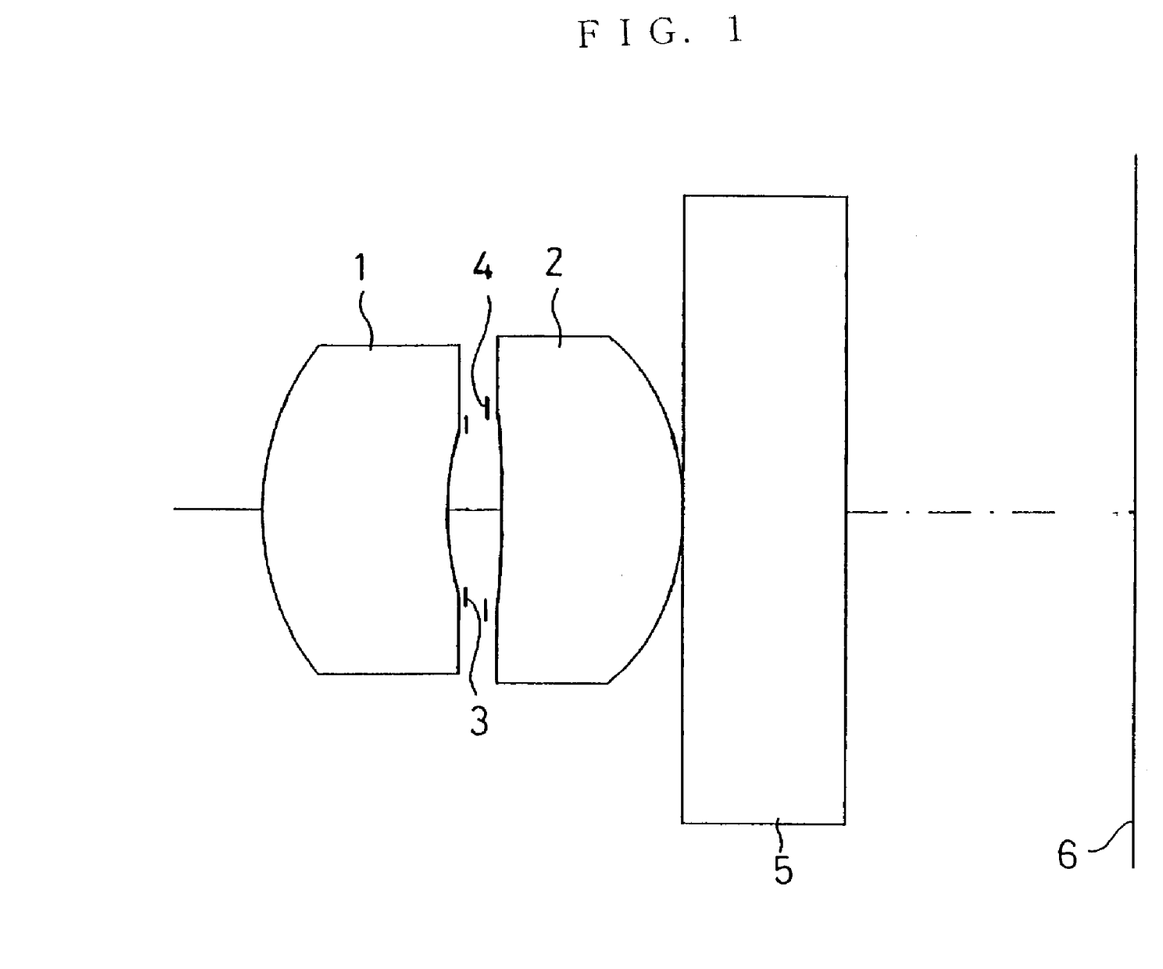
FIG. 1 is a schematic illustration showing an embodiment of an image pickup lens according to the present invention.

FIG. 1 shows an embodiment of an image pickup lens according to the present invention. The image pickup lens is made of, for example, glass, resin material or the like, and comprises a first lens 1 which is a meniscus lens having a positive power with its convex face facing the object side and a second lens 2 having a positive power with its strong convex face facing the image pickup surface side. Each lens face of the first lens 1 and the second lens 2 is to be referred to as the first face and the second face in order from the object side. Further, at least one face of the first face and the second face of each the first lens 1 and the second lens 2 is formed into the aspherical face.

Further, a diaphragm 3 is provided in the vicinity of the second face of the first lens 1 in between the second face of the first lens 1 and the first face of the second lens 2 while a light quantity control plate 4 is provided in a position closer to the first face of the second lens 2 than the diaphragm 3. Also, a cover glass, various kinds of filters 5 such as an IR cut filter and low-pass filter, and an image pickup surface 6 which is a light receiving face of an image pickup element such as a CCD or a CMOS and the like are provided, respectively, on the second face side of the second lens 2. It is possible to omit the various kinds of the filters 5 where appropriate.

Further, in the embodiment, the first lens 1 and the second lens 2 are to satisfy the condition represented by the following expressions:

$$4 \times f_2 \geq f_1 \geq f_2 \tag{1}$$

$$1.5 \times fl \geq f_2 \geq 0.9 \times fl \tag{2}$$

where, fl denotes the focal length of the whole lens system, $f_1$ denotes the focal length of the first lens, and $f_2$ denotes the focal length of the second lens.

The expression (1) is a condition for effectively correcting the coma aberration and the distortion aberration while increasing the telecentricity through keeping the distance between the exit pupil and the sensor. In the expression (1), if $f_1$ is larger than $4 \times f_2$, the powers of the two lenses becomes imbalanced so that it is difficult to effectively correct the coma aberration and the distortion aberration. Furthermore, the curvature of the second lens 2 becomes large so that it becomes difficult to manufacture. Also, if $f_1$ is smaller than $f_2$, the distance between the exit pupil and the sensor cannot be maintained so that the incoming ray to peripheral part of the sensor cannot be effectively utilized (causes shading). Furthermore, it becomes difficult to keep the back focus distance so that it becomes impossible to insert various kinds of filters.

The expression (2) is a condition for improving the productivity while increasing the telecentricity and effectively correcting the coma aberration and the distortion aberration. In the expression (2), if $f_2$ is larger than $1.5 \times fl$, the telecentricity is deteriorated so that the peripheral light quantity in the peripheral part of the sensor is decreased thereby causing shading. Further, the shape of the first lens 1 is to be limited thereby deteriorating the productivity. Also, if $f_2$ is smaller than $0.9 \times fl$, the powers of the two lenses becomes imbalanced so that it is difficult to effectively correct the coma aberration and the distortion aberration. Furthermore, the curvature of the second lens 2 becomes large so that it becomes difficult to manufacture.

Furthermore, in the embodiment, the first lens 1 and the second lens 2 are to satisfy the condition represented by the following expression:

$$1.1 \times fl \geq Ad \geq 0.65 \times fl \tag{3}$$

where, Ad is the distance from the first face of the first lens 1 to the second face of the second lens 2.

The expression (3) is a condition for improving the productivity while reducing the size of the optical system and, at the same time, keeping the high telecentricity.

In the expression (3), if Ad is larger than $1.1 \times fl$, the size of the total optical system becomes large so that productivity of each lens is deteriorated. Also, if Ad is smaller than $0.65 \times fl$, the allowable error becomes small due to the reduction in the size of each lens so that it becomes difficult to assemble. Furthermore, the telecentricity is deteriorated thereby causing shading.

In the embodiment, by satisfying the expressions (1) to (3), the distance between the exit pupil and the sensor can be maintained thereby increasing the telecentricity. Therefore, it enables effective use of the light. Also, the coma aberration and the distortion aberration can be effectively corrected. Therefore, the optical characteristic can be improved and, further, the productivity can be also improved.

Further, through providing the diaphragm 3 in the vicinity of the second face of the first lens 1 in between the second face of the first lens 1 and the first face of the second lens 2, the distance between the exit pupil and the sensor can be more surely maintained. Thereby, the telecentricity can be increased without imposing a load on the shape or the like of the second lens 2.

Also, the second lens 2 may be a meniscus lens having a positive power with its convex face facing the image pickup surface. Through providing the second lens 2 as the meniscus lens, high telecentricity can be maintained and, at the same time, the coma aberration and the distortion aberration can be effectively corrected.

EXAMPLES

Next, Examples of the present invention will be described by referring to FIG. 2 to FIG. 11.

In the Examples, f1 denotes the focal length (mm) of the whole lens system, $f_1$ denotes the focal length (mm) of the first lens 1, $f_2$ denotes the focal length (mm) of the second lens 2, and F No denotes F number. Further, r denotes the radius of curvature (mm) in the center of the optical surface, d denotes the distance (mm) between each optical surface on the optical axis, nd denotes the refractive index of an optical material (medium) present between with the next optical surface, and νd denotes the Abbe constant.

Provided that the optical axis direction is taken as a Z-axis, the direction perpendicular to the optical axis is taken as an X-axis, and the traveling direction of light is defined to be positive, the shape of the aspheric face of the lens is represented by a following expression (Eq 1):

$$Z = \frac{\frac{x^2}{r}}{1 + \sqrt{1 - (k+1)\frac{x^2}{r^2}}} + a_4 x^4 + a_6 x^6 + a_8 x^8 + a_{10} x^{10}$$

where, each of k, $a_4$, $a_6$, $a_8$ and $a_{10}$ is an aspherical factor.

Example 1

Figure 2:
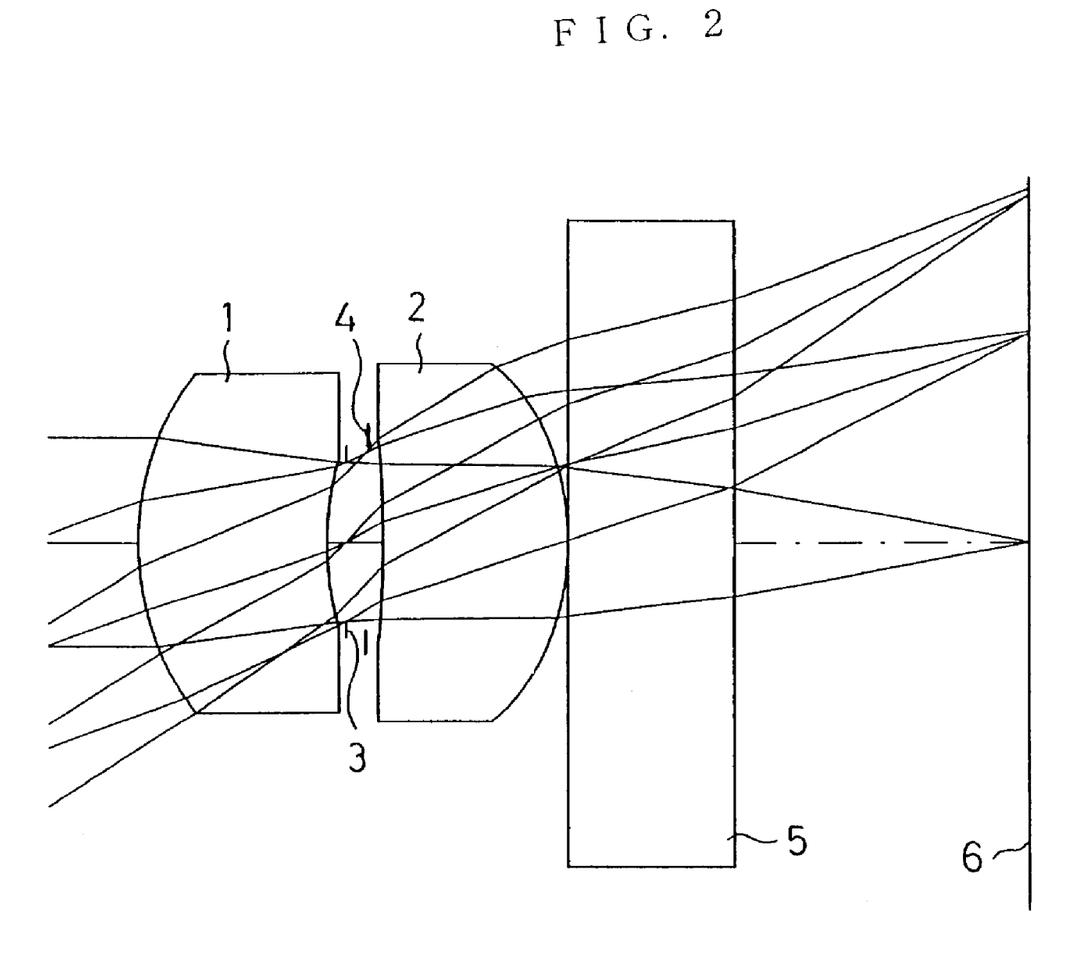
FIG. 2 is a schematic illustration showing Example 1 of the image pickup lens of the present invention.

FIG. 2 shows Example 1 of the present invention. In Example 1, as in the image pickup lens of the first embodiment shown in FIG. 1, the diaphragm 3 was provided in the vicinity of the second face of the first lens 1 and the light quantity control plate 4 was provided between the diaphragm 3 and the first face of the second lens 2.

The image pickup lens of Example 1 was set under the following condition:

f1=3.09 mm, $f_1$=9.35 mm, $f_2$=3.07 mm, F No=2.8

| Face | Radius r of Curvature | Distance d | Refractive Index nd | Abbe Constant νd |
|---|---|---|---|---|
| (1) First face of First lens | 1.538 | 1.0000 | 1.52 | 56.0 |
| (2) Second face of First lens | 1.739 | 0.0500 | | |

-continued

| Face | Radius r of Curvature | Distance d | Refractive Index nd | Abbe Constant νd |
|---|---|---|---|---|
| (3) Diaphragm | 0.000 | 0.1500 | | |
| (4) Light quantity control plate | 0.000 | 0.1000 | | |
| (5) First face of Second lens | −10.000 | 1.0000 | 1.52 | 56.0 |
| (6) Second face of Second lens | −1.435 | 0.0000 | | |
| (7) First face of Cover glass | 0.0000 | 0.9000 | 1.516 | 64.0 |
| (8) Second face of Cover glass | 0.000 | 1.5673 | | |
| (9) Image pickup surface | 0.000 | | | |

| | | Aspherical Factor | | |
|---|---|---|---|---|
| Face | K | $a_4$ | $a_6$ | $a_8$ | $a_{10}$ |
| 1 | 0.00e+00 | 9.47e−03 | 1.51e−02 | −1.79e−02 | 1.84e−02 |
| 2 | 3.88e+00 | −1.10e−02 | 9.20e−03 | 0.00e+00 | 0.00e+00 |
| 5 | 0.00e+00 | −1.01e−01 | 1.45e−01 | −7.45e−01 | 0.00e+00 |
| 6 | 5.39e−01 | 1.31e−02 | −4.82e−02 | 6.52e−02 | −5.61e−02 |

Under such condition, $f_1/f_2$=3.05 was achieved, thereby satisfying the expression (1). Further, $f_2/f1$=0.99 was achieved, thereby satisfying the expression (2).

Figure 3:
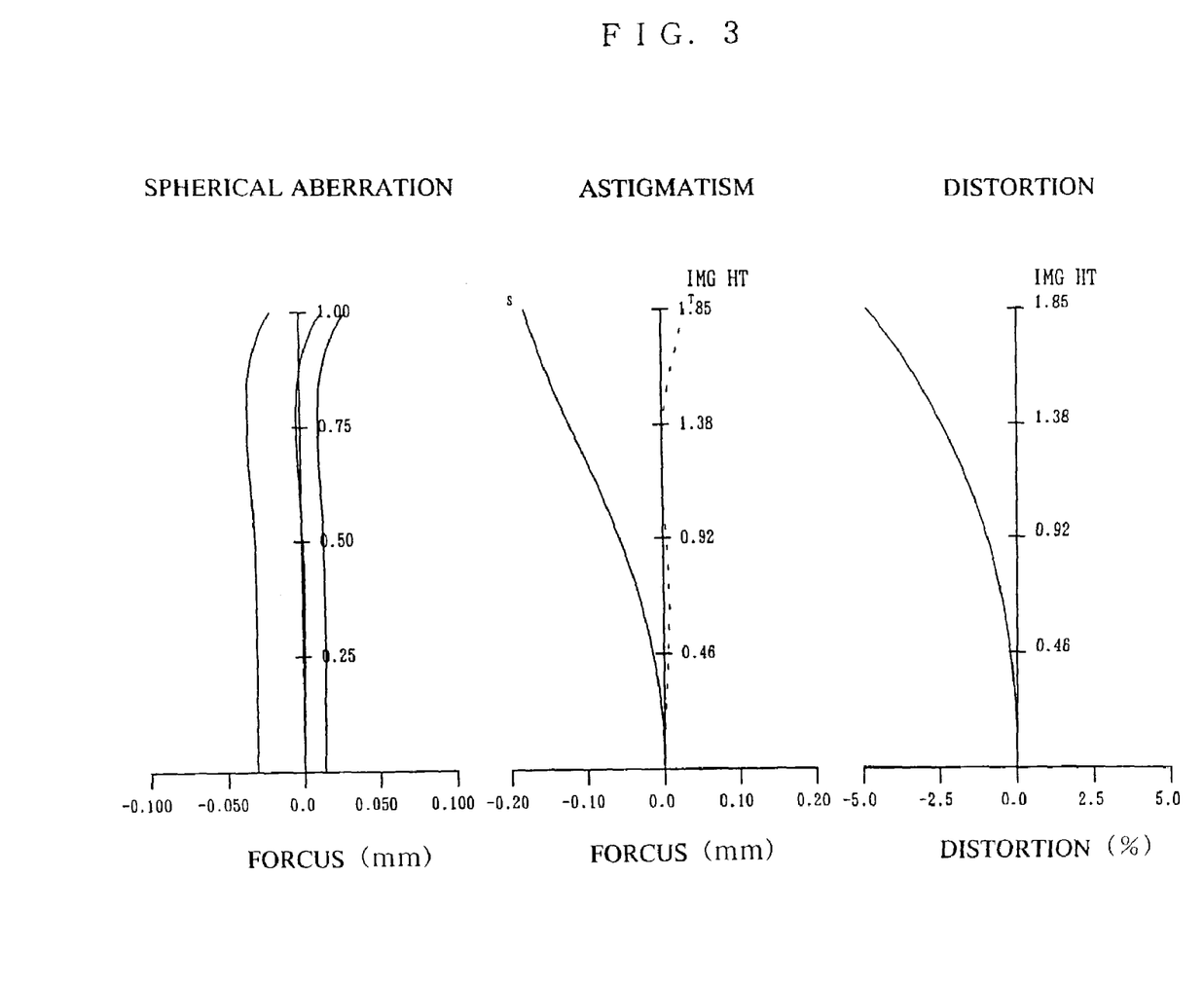
FIG. 3 is an explanatory illustration showing the spherical aberration, the astigmatism, the distortion aberration of the image pickup lens shown in FIG. 2.

FIG. 3 shows the spherical aberration, the astigmatism, and the distortion aberration in the image pickup lens of Example 1. According to the figure, it is clear that each value of the spherical aberration, the astigmatism and the distortion aberration is almost satisfactory so that a sufficient optical characteristic can be obtained.

Example 2

Figure 4:
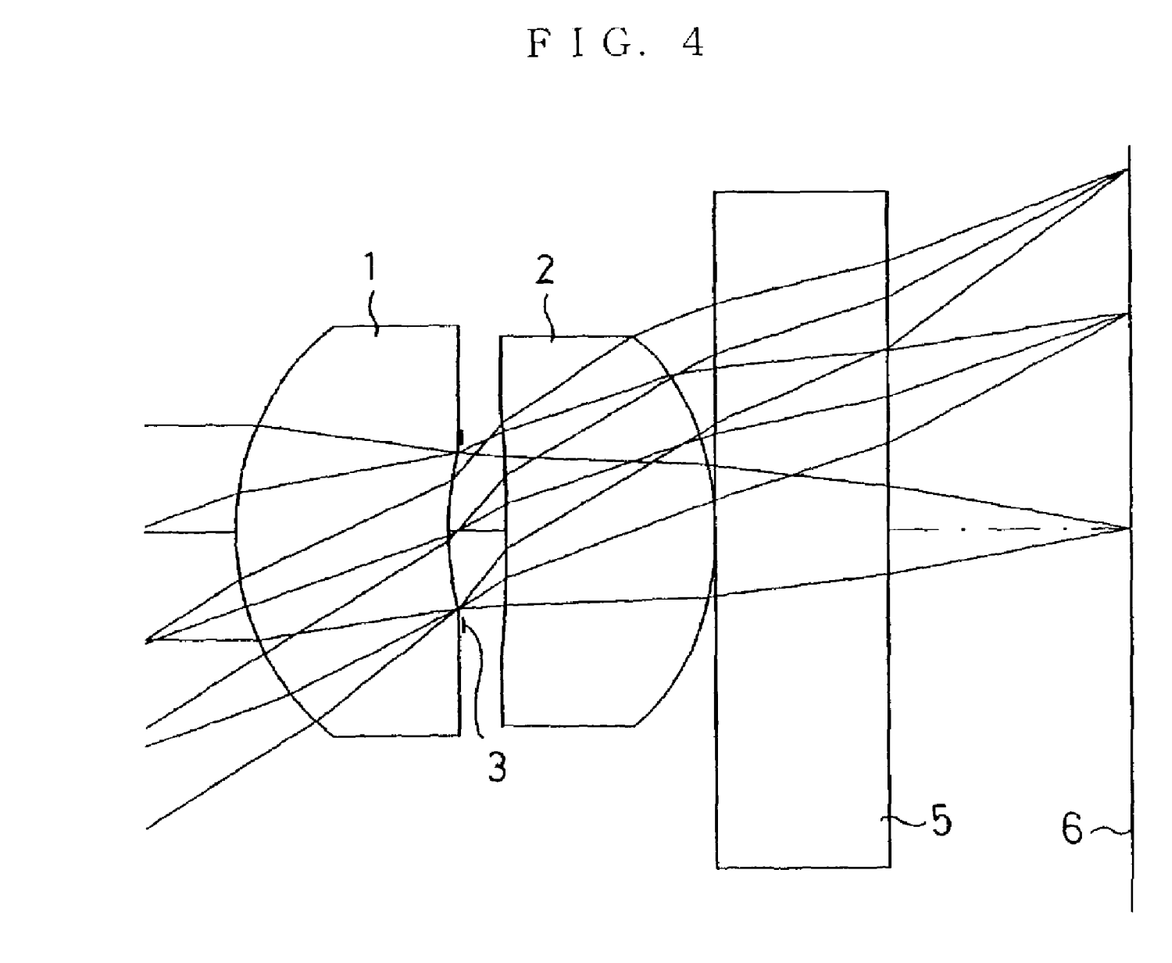
FIG. 4 is a schematic illustration showing Example 2 of the image pickup lens of the present invention.

FIG. 4 shows Example 2 of the present invention. In Example 2, as in the image pickup lens of the first embodiment shown in FIG. 1, the diaphragm 3 was provided in the vicinity of the second face of the first lens 1.

The image pickup lens of Example 2 was set under the following condition:

f1=3.09 mm, $f_1$=6.96 mm, $f_2$=3.20 mm, F No=2.8

| Face | Radius r of Curvature | Distance d | Refractive Index nd | Abbe Constant νd |
|---|---|---|---|---|
| (1) First face of First lens | 1.405 | 1.1000 | 1.52 | 56.0 |
| (2) Second face of First lens | 1.667 | 0.0500 | | |
| (3) Diaphragm | 0.000 | 0.2500 | | |
| (4) First face of Second lens | −20.000 | 1.1000 | 1.52 | 56.0 |
| (5) Second face of Second lens | −1.580 | 0.0000 | | |
| (6) First face of Cover glass | 0.0000 | 0.9000 | 1.516 | 64.0 |
| (7) Second face of Cover glass | 0.000 | 1.2489 | | |
| (8) Image pickup surface | 0.000 | | | |

| | | Aspherical Factor | | | |
|---|---|---|---|---|---|
| Face | K | $a_4$ | $a_6$ | $a_8$ | $a_{10}$ |
| 1 | 0.00e+00 | 2.91e-03 | 2.17e-02 | -2.32e-02 | 1.88e-02 |
| 2 | 6.61e+00 | -8.36e-02 | -3.57e-01 | 0.00e+00 | 0.00e+00 |
| 4 | 0.00e+00 | -9.21e-02 | -2.82e-02 | -2.25e-01 | 0.00e+00 |
| 5 | 9.12e-01 | 5.96e-03 | -1.69e-02 | 1.88e-02 | -1.57e-02 |

Under such condition, $f_1/f_2=2.18$ was achieved, thereby satisfying the expression (1). Further, $f_2/f_1=1.04$ was achieved, thereby satisfying the expression (2).

Figure 5:
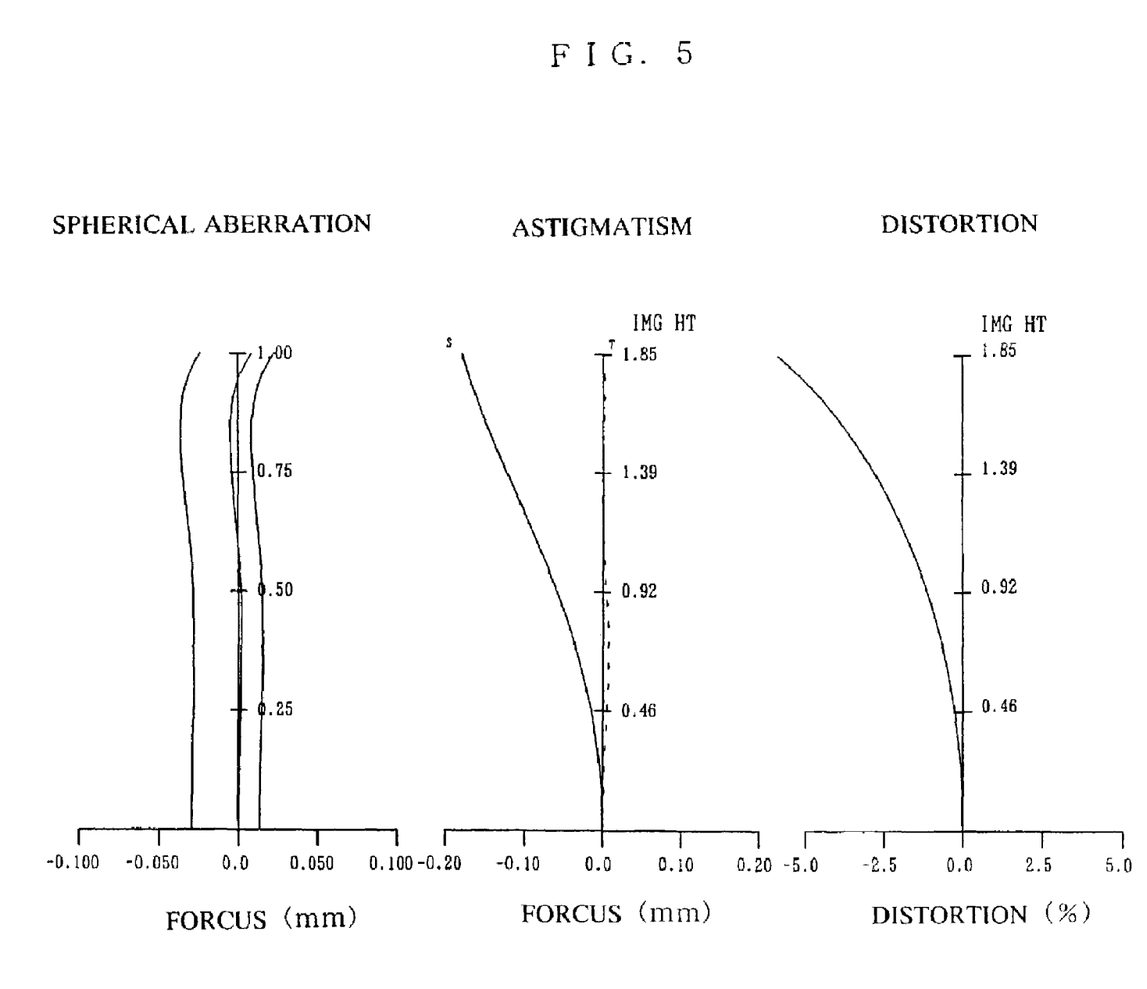
FIG. 5 is an explanatory illustration showing the spherical aberration, the astigmatism, the distortion aberration of the image pickup lens shown in FIG. 4.

FIG. 5 shows the spherical aberration, the astigmatism, and the distortion aberration in the image pickup lens of Example 2. According to the figure, it is clear that each value of the spherical aberration, the astigmatism and the distortion aberration is almost satisfactory so that a sufficient optical characteristic can be obtained.

Example 3

Figure 6:
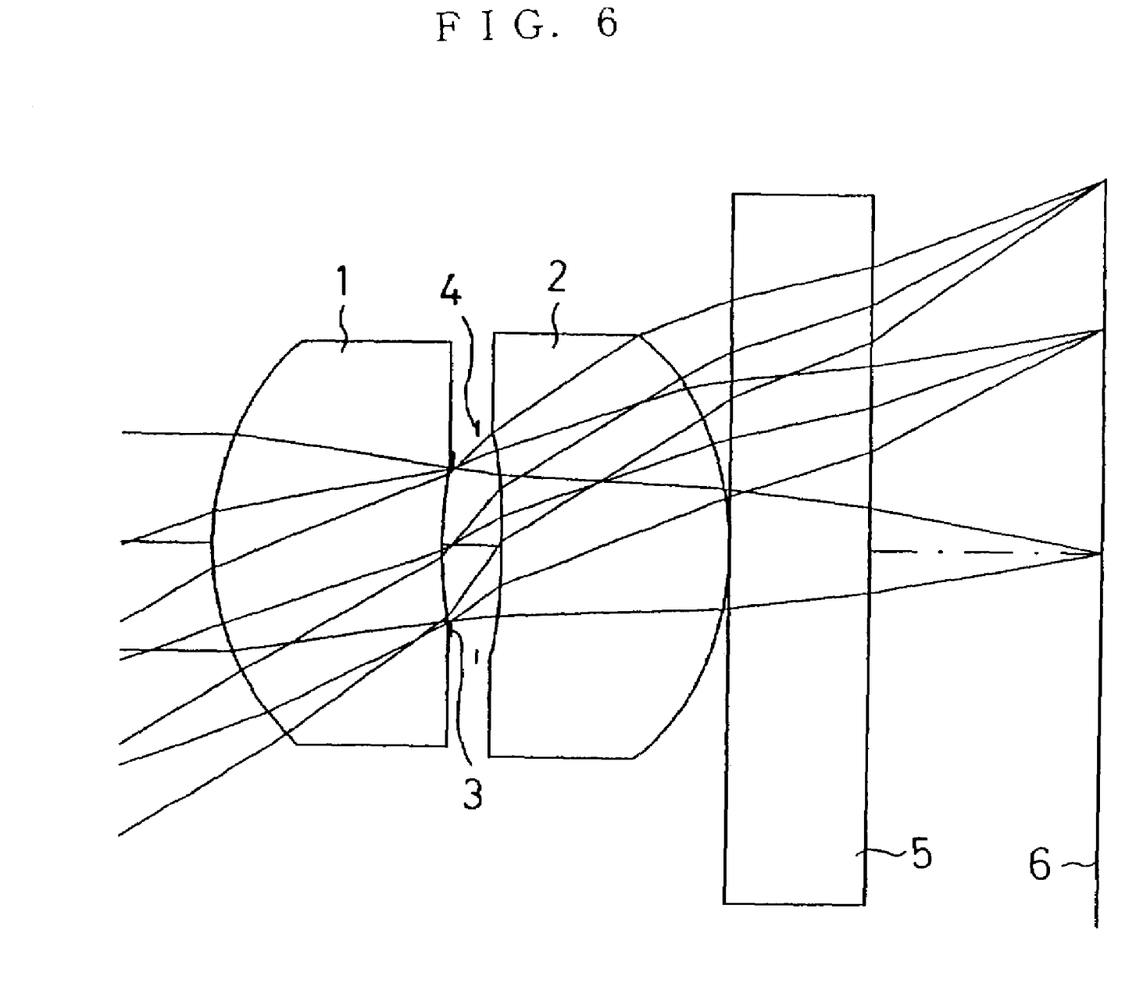
FIG. 6 is a schematic illustration showing Example 3 of the image pickup lens of the present invention.

FIG. 6 shows Example 3 of the present invention. In Example 3, as in the image pickup lens of the first embodiment shown in FIG. 1, the diaphragm 3 was provided in the vicinity of the second face of the first lens 1 and the light quantity control plate 4 was provided between the diaphragm 3 and the first face of the second lens 2.

The image pickup lens of Example 3 was set under the following condition:

fl=3.00 mm, $f_1$=4.55 mm, $f_2$=3.82 mm, F No=2.8

| | Face | Radius r of Curvature | Distance d | Refractive Index nd | Abbe Constant νd |
|---|---|---|---|---|---|
| (1) | First face of First lens | 1.418 | 1.1500 | 1.54 | 56.0 |
| (2) | Second face of First lens | 2.381 | 0.0500 | | |
| (3) | Diaphragm | 0.000 | 0.0500 | | |
| (4) | Light quantity control plate | 0.000 | 0.2000 | | |
| (5) | First face of Second lens | -4.878 | 1.1500 | 1.54 | 56.0 |
| (6) | Second face of Second lens | -1.575 | 0.0000 | | |
| (7) | First face of Cover glass | 0.0000 | 0.7000 | 1.516 | 64.0 |
| (8) | Second face of Cover glass | 0.000 | 1.1544 | | |
| (9) | Image pickup surface | 0.000 | | | |

| | | Aspherical Factor | | | |
|---|---|---|---|---|---|
| Face | K | $a_4$ | $a_6$ | $a_8$ | $a_{10}$ |
| 1 | 0.00e+00 | 8.06e-03 | -2.65e-03 | 1.51e-02 | 0.00e+00 |
| 2 | 1.70e+00 | 3.19e-02 | -1.47e-02 | 0.00e+00 | 0.00e+00 |
| 5 | 0.00e+00 | -1.26e-01 | -1.72e-01 | -4.59e-01 | 0.00e+00 |
| 6 | 7.16e-01 | 2.22e-02 | -3.37e-02 | 3.33e-02 | -1.90e-02 |

Under such condition, $f_1/f_2=1.19$ was achieved, thereby satisfying the expression (1). Further, $f_2/f_1=1.27$ was achieved, thereby satisfying the expression (2).

Figure 7:
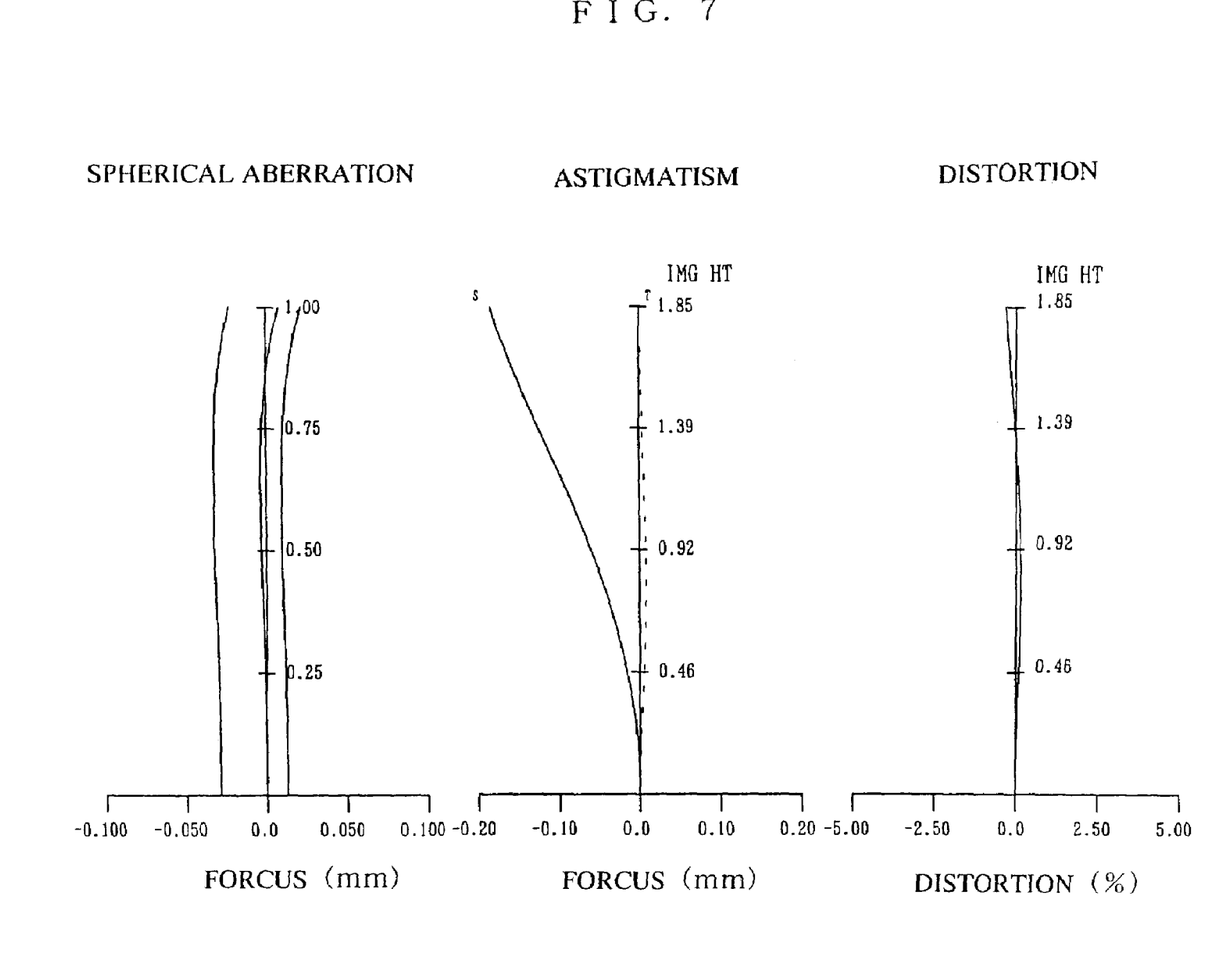
FIG. 7 is an explanatory illustration showing the spherical aberration, the astigmatism, the distortion aberration of the image pickup lens shown in FIG. 6.

FIG. 7 shows the spherical aberration, the astigmatism, and the distortion aberration in the image pickup lens of Example 3. According to the figure, it is clear that each value of the spherical aberration, the astigmatism and the distortion aberration is almost satisfactory so that a sufficient optical characteristic can be obtained.

Example 4

Figure 8:
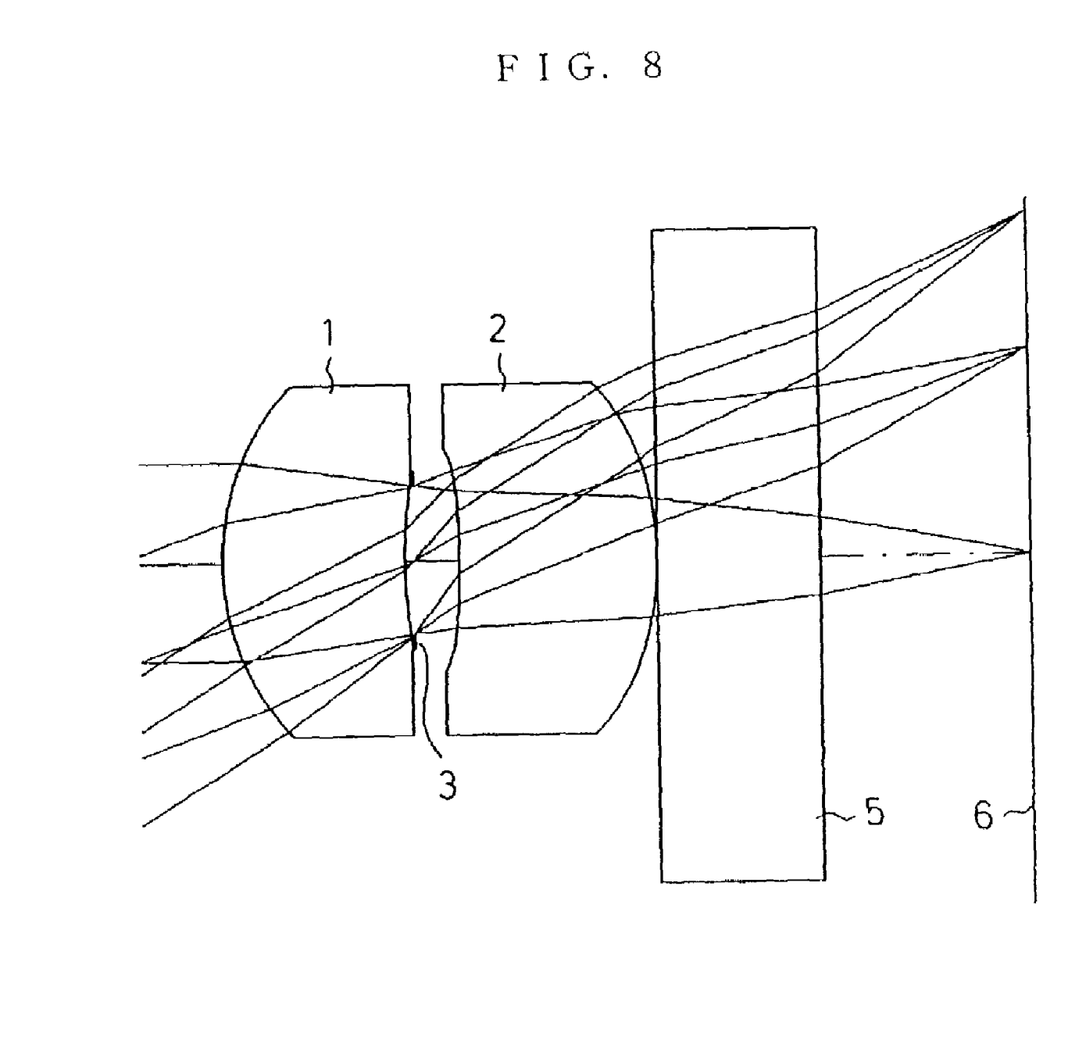
FIG. 8 is a schematic illustration showing Example 4 of the image pickup lens of the present invention.

FIG. 8 shows Example 4 of the present invention. In Example 4, as in the image pickup lens of the first embodiment shown in FIG. 1, the diaphragm 3 was provided in the vicinity of the second face of the first lens 1.

The image pickup lens of Example 4 was set under the following condition:

fl=3.00 mm, $f_1$=4.61 mm, $f_2$=4.15 mm, F No=2.8

| | Face | Radius r of Curvature | Distance d | Refractive Index nd | Abbe Constant νd |
|---|---|---|---|---|---|
| (1) | First face of First lens | 1.405 | 1.0000 | 1.52 | 56.0 |
| (2) | Second face of First lens | 2.525 | 0.0500 | | |
| (3) | Diaphragm | 0.000 | 0.2500 | | |
| (4) | First face of Second lens | -5.438 | 1.1000 | 1.52 | 56.0 |
| (5) | Second face of Second lens | -1.663 | 0.0000 | | |
| (6) | First face of Cover glass | 0.0000 | 0.9000 | 1.516 | 64.0 |
| (7) | Second face of Cover glass | 0.000 | 1.1486 | | |
| (8) | Image pickup surface | 0.000 | | | |

| | | Aspherical Factor | | | |
|---|---|---|---|---|---|
| Face | K | $a_4$ | $a_6$ | $a_8$ | $a_{10}$ |
| 1 | 0.00e+00 | -2.86e-03 | 2.76e-02 | -3.25e-02 | 1.83e-02 |
| 2 | -6.80e-02 | -1.29e-02 | -6.55e-02 | 0.00e+00 | 0.00e+00 |
| 4 | 0.00e+00 | -1.94e-01 | 1.56e-01 | -1.77e+00 | 0.00e+00 |
| 5 | 1.09e+00 | 7.06e-03 | -1.88e-02 | 2.62e-02 | -2.21e-02 |

Under such condition, $f_1/f_2=1.11$ was achieved, thereby satisfying the expression (1). Further, $f_2/f_1=1.39$ was achieved, thereby satisfying the expression (2).

Figure 9:
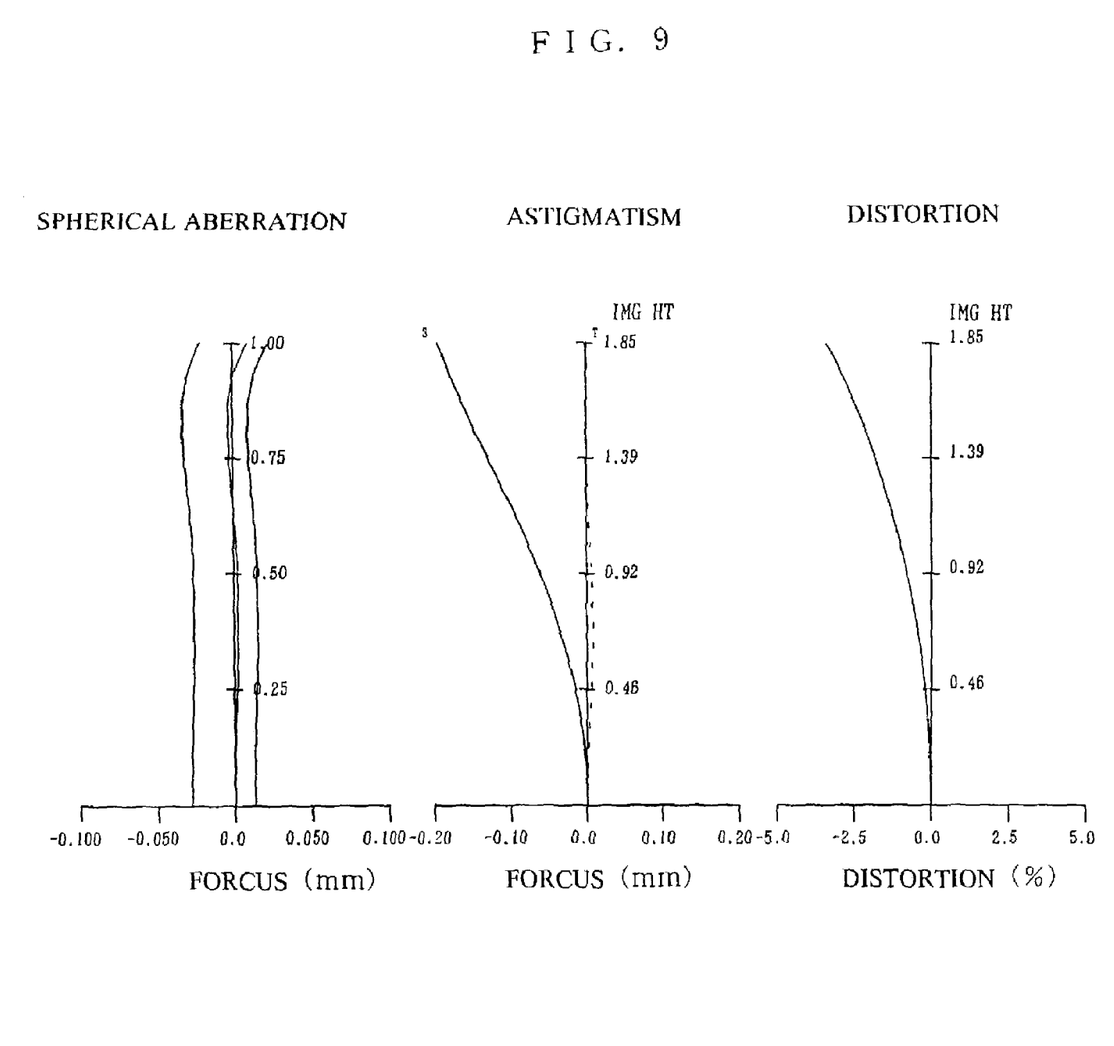
FIG. 9 is an explanatory illustration showing the spherical aberration, the astigmatism, the distortion aberration of the image pickup lens shown in FIG. 8.

FIG. 9 shows the spherical aberration, the astigmatism, and the distortion aberration in the image pickup lens of Example 4. According to the figure, it is clear that each value of the spherical aberration, the astigmatism and the distortion aberration is almost satisfactory so that a sufficient optical characteristic can be obtained.

Example 5

Figure 10:
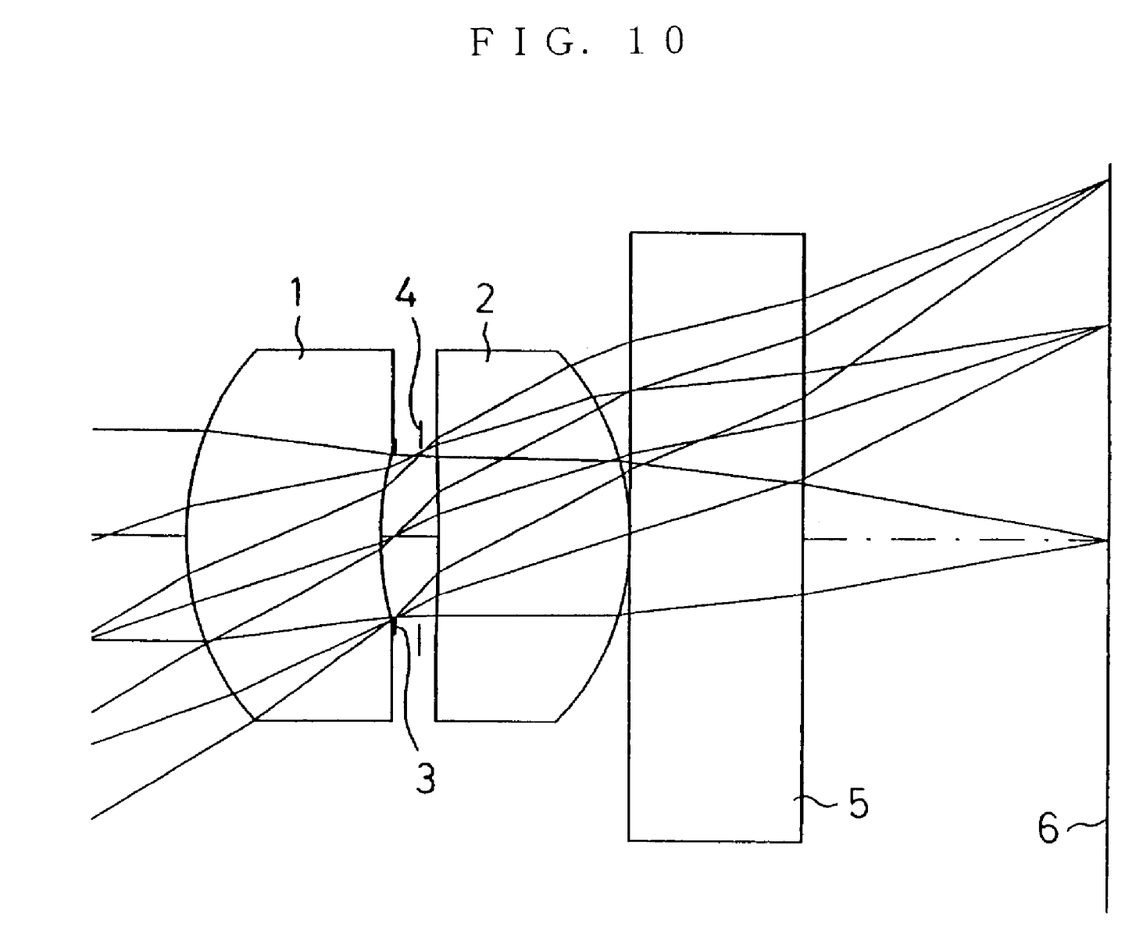
FIG. 10 is a schematic illustration showing Example 5 of the image pickup lens of the present invention.

FIG. 10 shows Example 5 of the present invention. In Example 5, as in the image pickup lens of the first embodiment shown in FIG. 1, the diaphragm 3 was provided in the vicinity of the second face of the first lens 1 and the light quantity control plate 4 was provided between the diaphragm 3 and the first face of the second lens 2. Further, in Example 5, the first face of the second lens 2 is to be the spherical face.

The image pickup lens of Example 5 was set under the following condition:

f1=3.09 mm, $f_1$=9.35 mm, $f_2$=3.07 mm, F No=2.8

|   | Face | Radius r of Curvature | Distance d | Refractive Index nd | Abbe Constant vd |
|---|---|---|---|---|---|
| (1) | First face of First lens | 1.538 | 1.0000 | 1.52 | 56.0 |
| (2) | Second face of First lens | 1.739 | 0.0700 | | |
| (3) | Diaphragm | 0.000 | 0.1000 | | |
| (4) | Light quantity control plate | 0.000 | 0.1300 | | |
| (5) | First face of Second lens | −10.000 | 1.0000 | 1.52 | 56.0 |
| (6) | Second face of Second lens | −1.435 | 0.0000 | | |
| (7) | First face of Cover glass | 0.0000 | 0.9000 | 1.516 | 64.0 |
| (8) | Second face of Cover glass | 0.000 | 1.5673 | | |
| (9) | Image pickup surface | 0.000 | | | |

| | Aspherical Factor | | | | |
|---|---|---|---|---|---|
| Face | K | $a_4$ | $a_6$ | $a_8$ | $a_{10}$ |
| 1 | 0.00e+00 | −8.10e−04 | 5.87e−02 | −6.66e−02 | 4.54e−02 |
| 2 | 8.11e+00 | −3.45e−02 | −3.54e−01 | 0.00e+00 | 0.00e+00 |
| 6 | 2.53e−01 | −9.79e−03 | 1.44e−02 | −1.76e−02 | −2.13e−03 |

Under such condition, $f_1/f_2$=3.05 was achieved, thereby satisfying the expression (1). Further, $f_2$/f1=0.99 was achieved, thereby satisfying the expression (2).

Figure 11:
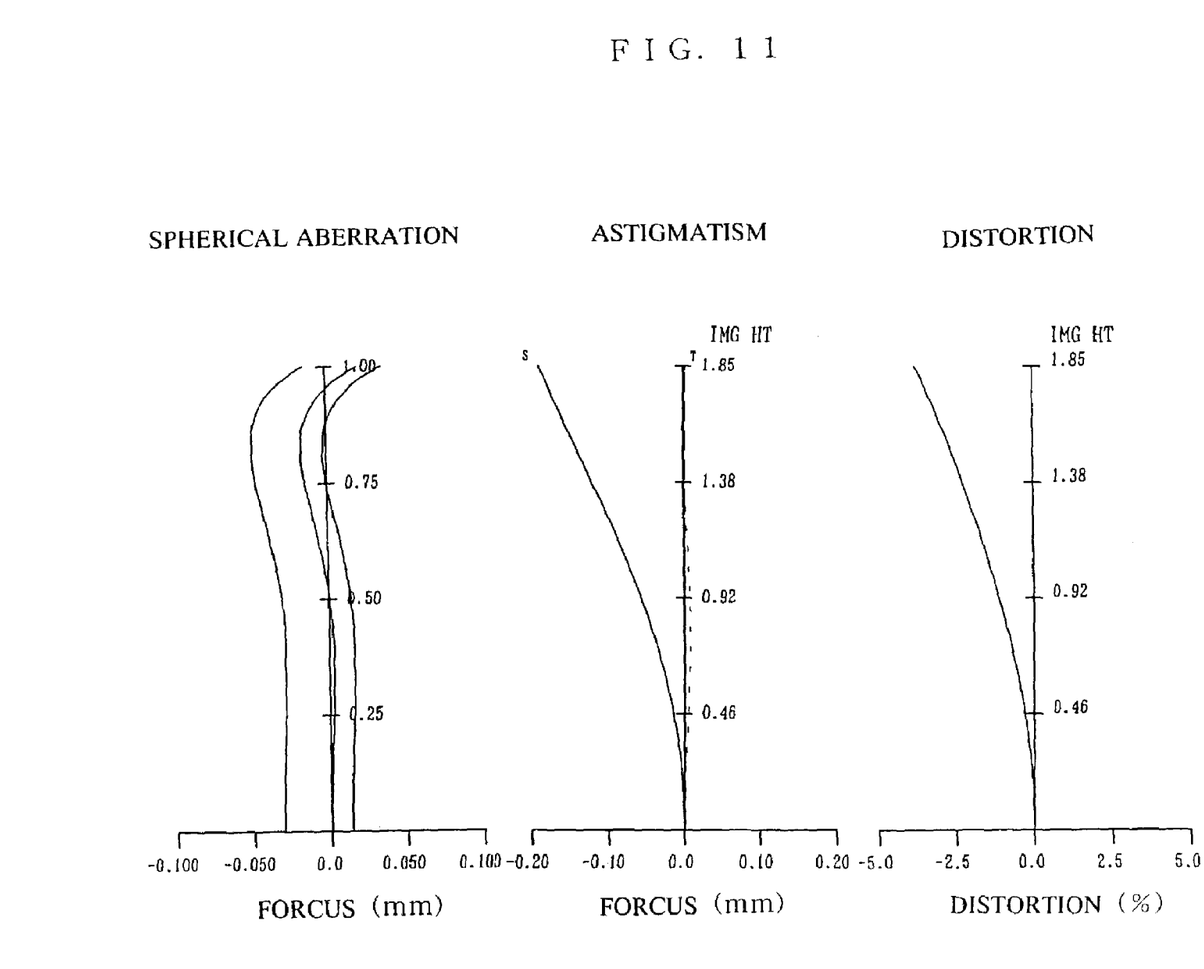
FIG. 11 is an explanatory illustration showing the spherical aberration, the astigmatism, the distortion aberration of the image pickup lens shown in FIG. 10.

FIG. 11 shows the spherical aberration, the astigmatism, and the distortion aberration in the image pickup lens of Example 5. According to the figure, it is clear that each value of the spherical aberration, the astigmatism and the distortion aberration is almost satisfactory so that a sufficient optical characteristic can be obtained.

The present invention is not limited to the above-described embodiment but various modifications are possible when necessary.

As described, the image pickup lens according to one aspect of the present invention, through satisfying the expressions (1) and (2), the distance between the exit pupil and the image pickup surface (sensor) can be maintained thereby to increase the telecentricity. Thus, it enables effective use of the light. Further, it becomes possible to effectively correct the coma aberration and the distortion aberration. Therefore, the optical characteristic as well as the productivity can be improved.

Further, in one aspect of the present invention, a diaphragm is provided in the vicinity of the first lens 1 in between the first lens 1 and the second lens. Thus, the distance between the exit pupil and the image pickup surface (sensor) can be more surely maintained. Therefore, the telecentricity can be increased without imposing a load on the shape and the like of the second lens.

Furthermore, in one aspect of the present invention, the second lens is provided to be the meniscus lens having a positive power with the convex face facing the image pickup surface side. Therefore, the telecentricity can be effectively maintained and the coma aberration and the distortion aberration can be effectively corrected.

Moreover, in one aspect of the present invention, the first lens and the second lens are made of a resin material and, at the same time, at least one face of the first lens and the second lens is formed into an aspherical face. Therefore, a high optical characteristic can be maintained while maintaining the productivity.

What is claimed is:

1. An image pickup lens comprising a first lens which is a meniscus lens having a positive power with its convex face facing an object side, a diaphragm, and a second lens which is a lens having a positive power with a strong convex face facing an image pickup surface side being provided in order from the object side, wherein said first lens and said second lens satisfy a condition represented by following expressions:

$$3.05 \times f_2 \geq f_1 \geq f_2 \quad (1)$$

$$1.5 \times f1 \geq f_2 \geq 0.9 \times f1 \quad (2)$$

where, f1: focal length of the whole lens system
$f_1$: focal length of said first lens
$f_2$: focal length of said second lens.

2. The image pickup lens according to claim 1, wherein said diaphragm is placed in the vicinity of said first lens in between said first lens and said second lens.

3. The image pickup lens according to claim 1 or claim 2, wherein said second lens is a meniscus lens with its convex face facing an image pickup surface side.

4. The image pickup lens according to claim 1 or claim 2, wherein said first lens and said second lens are made of a resin material and at least one face of said first lens and said second lens is formed into an aspherical face.

5. The image pickup lens according to claim 1 or claim 2, wherein said second lens is a meniscus lens with its convex face facing an image pickup surface side, and said first lens and said second lens are made of a resin material and at least one face of said first lens and said second lens is formed into an aspherical face.

* * * * *